(12) United States Patent
Hoehne et al.

(10) Patent No.: US 7,285,753 B2
(45) Date of Patent: Oct. 23, 2007

(54) HEATING SYSTEM FOR USE IN ON-BOARD KITCHENS IN MEANS OF TRANSPORT AND A METHOD FOR HEATING FOOD ON BOARD MEANS OF TRANSPORT, IN PARTICULAR AIRCRAFT

(75) Inventors: Merle Hoehne, Hamburg (DE); Joachim Hoehne, Hamburg (DE); Hans-Juergen Heinrich, Hamburg (DE)

(73) Assignee: Airbus Deutschland GmbH (DE)

( * ) Notice: Subject to any disclaimer, the term of this patent is extended or adjusted under 35 U.S.C. 154(b) by 96 days.

(21) Appl. No.: 11/010,493

(22) Filed: Dec. 13, 2004

(65) Prior Publication Data

US 2005/0158041 A1    Jul. 21, 2005

(30) Foreign Application Priority Data

Dec. 20, 2003   (DE) ............................... 103 30 303

(51) Int. Cl.
  *A47J 36/24*   (2006.01)
  *C09K 5/02*   (2006.01)
  *C09K 5/00*   (2006.01)
  *F24J 1/00*   (2006.01)
  *F25B 17/08*   (2006.01)
  *B64C 1/00*   (2006.01)

(52) U.S. Cl. ............... 219/386; 219/385; 219/399; 219/202; 219/214; 392/339; 392/340; 392/345; 392/346; 244/129.1; 165/104.15; 165/104.17

(58) Field of Classification Search ............ None
See application file for complete search history.

(56) References Cited

U.S. PATENT DOCUMENTS

| | | | | |
|---|---|---|---|---|
| 3,042,348 A | * | 7/1962 | Lutts, Sr. ............... | 246/453 |
| 3,875,370 A | * | 4/1975 | Williams .............. | 219/386 |
| 4,198,559 A | * | 4/1980 | Walter et al. ......... | 219/387 |
| 4,829,772 A | * | 5/1989 | Bogdanovic et al. ... | 62/48.1 |
| 4,936,377 A | | 6/1990 | DeVogel et al. | |
| 6,108,489 A | * | 8/2000 | Frohlich et al. ....... | 392/346 |
| 6,267,045 B1 | * | 7/2001 | Wiedemann et al. ... | 99/330 |
| 6,392,201 B1 | * | 5/2002 | Owens ................. | 219/387 |
| 6,501,057 B1 | * | 12/2002 | Jarvis .................. | 219/621 |
| 2004/0159646 A1 | * | 8/2004 | Fortmann ............. | 219/386 |

(Continued)

FOREIGN PATENT DOCUMENTS

DE      3639545 C1    6/1988

(Continued)

*Primary Examiner*—Joseph Pelham
(74) *Attorney, Agent, or Firm*—Lerner, David, Littenberg, Krumholz & Mentlik, LLP

(57) ABSTRACT

For use on board a mobile means of transport (eg. aircraft, bus, ship), a heating system and method are described which lead to a reduction of peak demand in the on-board kitchen energy supply system relating to the integrated heating appliances for the warming or heating of food. For this, latent or thermochemical heat storage units are used which are fully integrated into the structural elements of the heating appliance in question and heats the product in such a way that there is sufficient heat output, while at the same time, the absolute temperature is limited by means of an appropriate choice of heat storage material for product enhancement.

16 Claims, 2 Drawing Sheets

U.S. PATENT DOCUMENTS

2005/0193760 A1 * 9/2005 Moran et al. .................. 62/371

FOREIGN PATENT DOCUMENTS

| EP | 0132475 | A1 * | 12/1985 |
| EP | 271732 | A2 | 6/1988 |
| WO | WO-99/63277 | | 12/1999 |
| WO | WO0079201 | A1 * | 12/2000 |

* cited by examiner

HEATING SYSTEM FOR USE IN ON-BOARD KITCHENS IN MEANS OF TRANSPORT AND A METHOD FOR HEATING FOOD ON BOARD MEANS OF TRANSPORT, IN PARTICULAR AIRCRAFT

BACKGROUND OF THE INVENTION

The present invention relates to a heating system for use in on-board kitchens in means of transport and a method for heating food on board means of transport, in particular aircraft.

On board aircraft, as well as in other mobile units, appliances are used for the heating up of food. The food is generally supplied in ready cooked condition by gastronomy companies in the so-called catering world, and they must be enhanced in appearance and heated up for the specified length of time shortly before serving them to the passengers. Because of insufficient supply of thermal energy to the product which is not ideal for the quality of the product, the sensory quality in particular (taste, consistency) and the appearance of the product often suffer.

Moreover, if several heating appliances (for example ovens and appliances for preparing hot water) are used at the same time, peak demand in the on-board kitchen generally leads to an undesirable increase in cost because, even if the requirement for power for the peak demand is only short-lived, it still results in an increase in expenditure for the supply of energy by means of generators, energy cells and other power sources. This increase in expenditure has, amongst other things, negative knock-on effects for the aircraft such as equipment and running costs as well as weight and structural volume requirements by providing a power source large enough to respond to the case where maximum performance is required (peak demand).

Previous methods for supplying additional heat energy without increasing the electric connection power make use of sensitive, latent or thermochemical heat storage systems for additional heating.

In WO 99/63277, a cooking appliance with additional units based upon the storage and release system of latent heat is described which can be used to compensate for peak demands.

In DE 3639545 C1 a method principle is described for the storage and transformation of heat and creation of cold with the help of two metal hydride/metal hydrogen systems working together in a closed circuit with different temperatures. In technically relevant temperature and pressure situations with hydrogen under high heat toning, many metals react to metal hydride. By variation of the hydrogen pressure, the heat output temperature can be varied. The high temperature storage can then be used as a heat energy buffer whenever there is an increased requirement for heat energy and heat energy is supplied to a cooking pot.

SUMMARY OF THE INVENTION

A heating system according to an exemplary embodiment of the present invention is believed to ensure the heat supply to on-board kitchens in means of transport with heating and is believed to avoid peak demands during on-board cooking operations and thus relieve the electrical on-board supply in the means of transport. Moreover, the heating system is believed to be adapted in such a way that sufficient heat output is supplied for heating the products while at the same time limiting the absolute temperature for product enhancement of the food to be heated up.

With the heating system proposed and the method, optimisation of the provision of energy for appliances in on-board kitchens may be achieved in particular. At least one part of the heating operation or the whole heating operation may be ensured by an appropriate heat storage material so that the quickly available thermal energy in the heat storage unit can be used in phases of heightened power demand within the onboard supply, and this is believed to relief of the electric on-board supply. The storage unit, based on latent or thermo-chemical heat storage is used here, not as an additional unit, but as a fully integrated component part of the heating equipment.

If a heat storage unit based on metal hydride is being used, the hydrogen is taken from a decentralized hydrogen storage unit, hydrogen routing system or a central hydrogen producer (eg. reformation).

During the hydrogen desorption phase during which heat energy is stored up, the hydrogen can be released at a storage unit previously named as the source and which contains a low temperature hydride and a routing system, or at a fuel cell. At times when the heating appliance is not being used, additional electric energy is produced by a combination of the heating appliances described here with a fuel cell. This can either be made available for other users or be used for the electrical heating of the heat storage unit during the hydrogen desorption phase in so far as no other heat source is provided at the same time.

Heating using the appliances in the oven area is believed to be improved to such an extent that sufficient heat output is provided for the product heating whilst at the same time the absolute temperature is limited by an appropriate choice of heat storage materials for product enhancement, without the distribution of heat (eg. by means of a ventilator) having to prevent burning. The electric heating is integrated into the containers/reactors. In this way a greater supply of energy is guaranteed without overheating the product. The energy can be supplied to the food to be heated up by means of heat radiation, by using heat conduction (if required, backed up by good heat conducting product packaging—eg. aluminium dishes) and by a heat conveyance fluid.

A heating system according to an exemplary embodiment of the present invention has a light structure, e.g.
  thin walls
  compaction of the metal hydride material
  use of direct heat transfer (metal hydride-wall-dish-food, without having to use any additional heat conveyance media)

Further details and advantages are given in the following description of a version of the invention.

The drawing shows versions of the invention which is described in greater detail in FIGS. 1 and 2 below. The figures describe the same components with the same reference signs.

DETAILED DESCRIPTION

In order to relieve the on-board electrical supply, for example on board aircraft, the total proportion of loading for providing heat in the oven area is guaranteed by means of an appropriate heat storage material based on latent or thermochemical heat storage and which is fully integrated in the structural elements of the heating appliance in question. The heating is integrated into the heating or oven area in such a way that sufficient heat output is provided to heat the product, while at the same time limiting the absolute temperature by means of an appropriate choice of heat storage materials for product enhancement, without the heat distribution (by means of a ventilator, for example) having to prevent burning.

The storage unit based upon latent or thermochemical heat storage is not used as an additional unit here, but rather as a fully integrated component of the heating appliance.

The following definitions for terms are used:

| | |
|---|---|
| Latent heat storage | Creation of an available energy supply by phase changes of the storage medium (eg. solid/liquid) |
| Sensitive heat storage | Creation of an available energy supply by changing the temperature of the storage medium |
| Thermochemical heat storage | Creation of an available energy supply by chemical reaction of the storage medium |
| Heat storage unit | Unit for the intermediary storage of thermal energy |
| Hydrogen storage unit | Unit for the intermediary storage of hydrogen |
| High temperature hydride | Metal hydride which has a hydrogen desorption pressure of 1 bar at temperatures in excess of 200° C. |
| Low temperature hydride | Metal hydride which has a water desorption pressure of 1 bar at temperatures below 100° C. |

Figure 1:
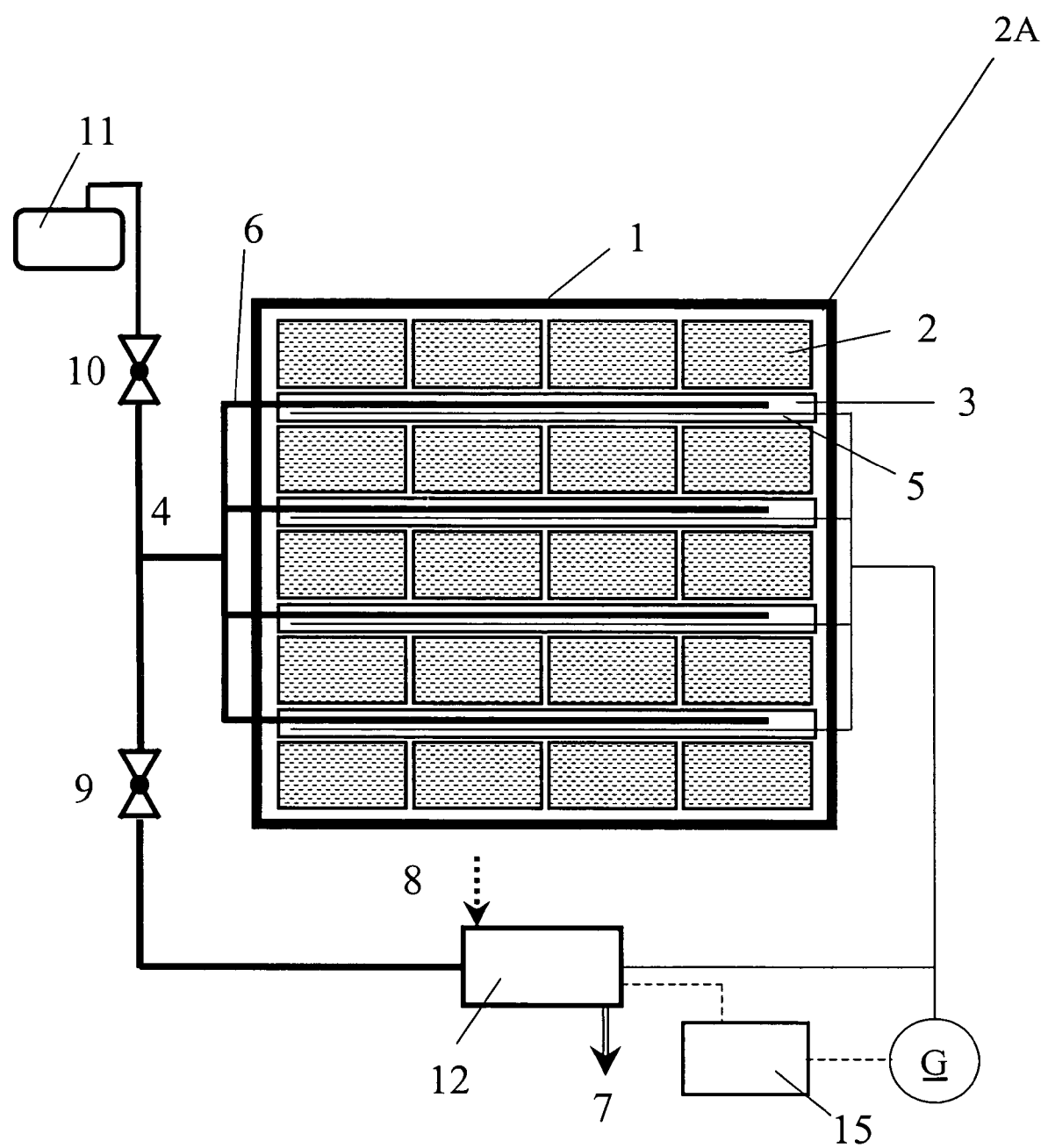
FIGS. 1 and 2 both show a schematic representation of a version of a heating system to be used in the on-board kitchens of means of transport whereby a method can be followed for heating up food.

With the heating system shown in FIG. 1 for use in on-board kitchens in means of transport, a heating appliance 1 for the heating of food is shown, for which a heat storage unit 3 with high temperature metal hydride is used as a heating medium. The heating appliance 1, for example in the form of an oven for the heating of food in aircraft, has a heating area 2A in which, for example, catering containers 2 are positioned with the food to be heated up. The heating area 2A can be of a different type or design not shown so that it can specifically be heated by liquids such as, for example, water using the flow-through or storage (boiler) method which is found in coffee machines, hot water appliances, general warm water appliances and similar equipment.

The high temperature metal hydride is a thermochemical heat storage unit 5 which is used to create an available energy supply by means of chemical reaction of the storage medium. The metal hydride can, for example, be replaced by a magnesium alloy.

During periods of low loading, hydrogen is desorbed by the supply of heat energy by means of electric heating elements 5. This hydrogen can be taken via a hydrogen routing system 4 and a valve 10 either to a hydrogen storage unit 11, or made available as fuel to a fuel cell 12 via a valve 9. The energy which is freed from the fuel cell can also be used to heat the storage elements 3. Alternatively, the energy is supplied by a direct current source (G) or by the on-board supply for the means of transport. An appropriate regulation system with a regulator unit 15 guarantees operation when the loading is at minimum in relation to the required electrical power. If the hydrogen is fully desorbed, there is pure metal in the heating elements. If the contents of the catering container 2 are now heated to a required eating temperature, hydrogen is taken at a pressure which is above the absorption pressure of the metal (hydride) used, and at the required temperature, from the hydrogen storage unit 11. The level of this pressure varies with the absorption temperature and is material specific. An appropriate weight-optimised system of pipes made with thin walls, a corresponding choice of material and in short lengths, and which acts as a hydrogen distribution system 6, guarantees even reaction and so releases heat into the heating elements. Provided the catering containers 2 are made from good heat-conducting materials, these act as additional heat conduction structures. In this case, a direct contact between the heat storage units 3 containing the heating elements 5 and the catering containers 2 is desirable.

The electric heating which provides heat during the heat storage or is an optional addition to the heat output provided by the heat storage unit during hydrogen absorption can be integrated into the components of the heating appliance 1 in such a way that the radiation heat from the electric heating elements 5 is evened out so that it does not spoil the food.

If using the heat storage unit 3 based on metal hydride with the described combination of the heating appliance 1 with the fuel cell 12, the hydrogen provided can be used to create additional electric energy during the hydrogen desorption phase of the heating storage unit, whereby the electric energy created can either be made available to other users of the on-board energy supply or used for the electric heating of the heat storage unit itself during the heat storage phase.

Figure 2:
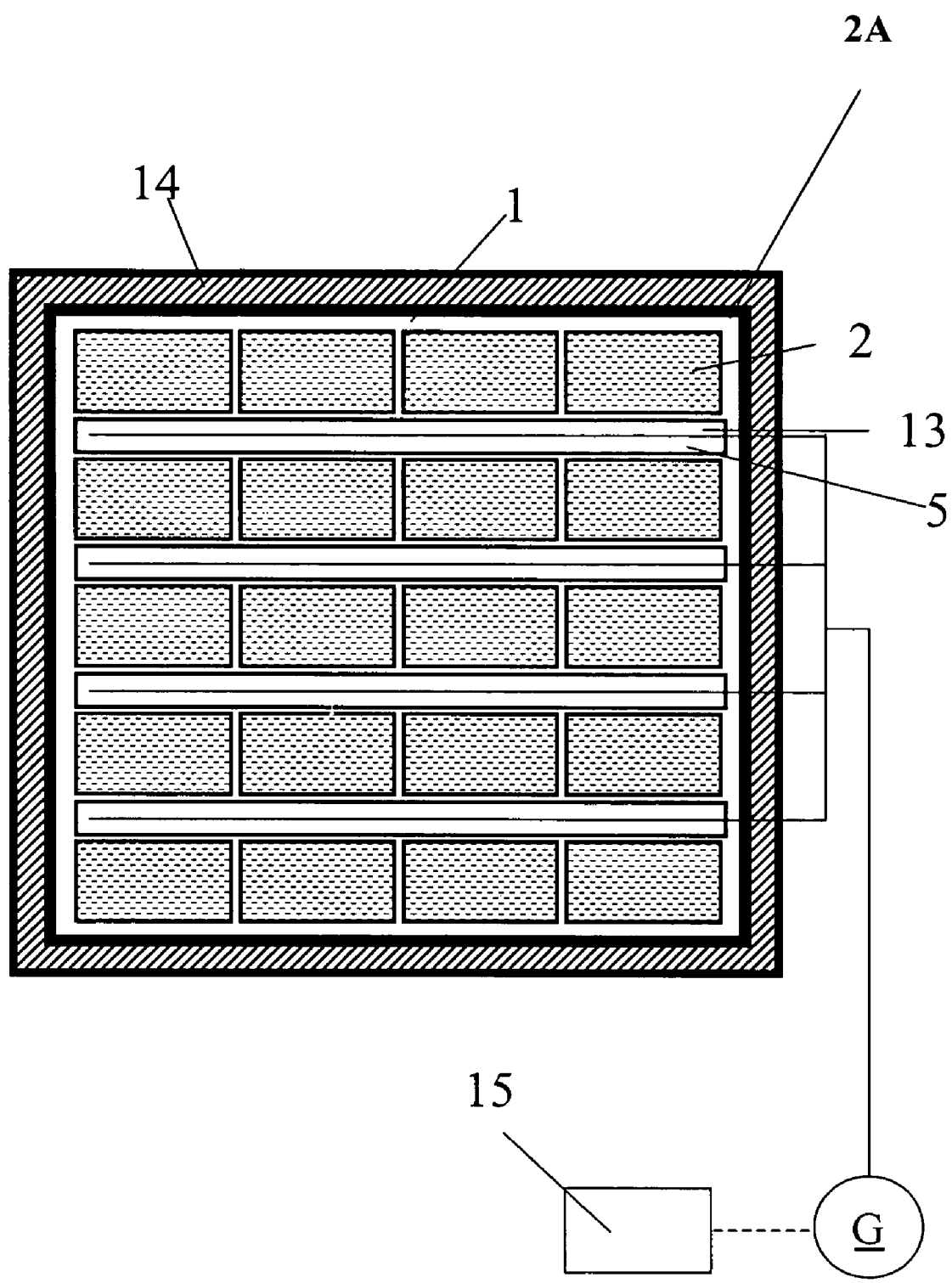

With the method variations shown in FIG. 2, a latent heat storage material 13 is integrated instead of the metal hydride into the heat storage units 3 containing the heating elements 5. This is heated up to the required temperature during periods of low loading by means of the electrical heating elements 3 (or some other heat source). The energy supply is adjusted using a regulation unit 15. In order to keep the loss of energy to a minimum during periods of standstill, special insulation 14 is provided for the whole heating area 2A. In order to heat up the food, the catering containers 2 are pushed into the heating system and the heat storage unit provides even heat to heat up the food. By choosing appropriate heat storage materials, the food can be heated up and enhanced in appearance. With both variations, the heating in the heating or oven area 1 can be supplemented by the addition of a heat conveyor (eg. air, water) so as to increase heat distribution.

The whole unit is designed observing the special safety requirements for the means of transport in question, optimising weight and space as far as possible. The features of the invention presented by this description, the claims and the drawing can be of significance both individually and in combination for the realisation of the invention in its different variational forms.

The invention claimed is:
1. Heating system for heating a product for use in on-board kitchens of means of transport, the heating system, comprising:
  a heating area;
  catering containers arranged in the heating areas;
  electric heating elements;
  a heat storage unit coupled to the electric heating elements;
  wherein the electrical heating elements are arranged for providing at least a partial heat supply to the product based on thermochemical heat storage;
  wherein the heat storage is thermochemical heat storage;
  wherein a high temperature metal hydride is used as the thermochemical heat storage unit.

2. The heating system of claim 1,
wherein the heat storage unit is connected to a hydrogen storage unit by means of a hydrogen routing system and a first valve or to a central hydrogen producer by means of a second valve.

3. The heating system of claim 1,
wherein a heat output sufficient to heat the product can be achieved, while at the same time the maximum temperature is limited by means of an appropriate choice of heat storage material.

4. The heating system of claim 1, further comprising a circulator for circulating a heat carrier for distributing the heat in the heating area.

5. The heating system of claim 1, comprising:
a control unit;
wherein the control unit controls the supply of electrical energy to the electrical heating elements, either by means of a direct current source or by means of the energy being released from a fuel cell.

6. Method for the heating of food on board means of transport, comprising the steps of:
producing sufficient heat output to heat the product at the same time as the maximum temperature is limited by thermochemical heat storage units;
actuating the heat storage units to work in conjunction with electrical heating elements of a heating area,
wherein a high temperature metal hydride is used as at least one of the thermochemical heat storage units.

7. The method of claim 6, wherein the heating in the heating area is supplemented by an additional heat conveyor, so as to increase heat distribution.

8. A method for heating a product, comprising the steps of:
producing sufficient heat output to heat the product at the same time as the maximum temperature is limited by latent or thermochemical heating storage units;
actuating the heat storage units to work in conjunction with electrical heating elements of a heating area;
taking hydrogen during the absorption phase, ie. during heat release from at least one of a decentralized hydrogen storage unit, hydrogen routing system and a central hydrogen producer when using a heat storage unit based on metal hydride;
supplying the hydrogen during the desorption phase, ie. during heat take-up, to a decentralized hydrogen storage unit or a hydrogen routing system.

9. The method of claim 8, wherein the electric heating used to provide heat during the heat storage phase or as an optional addition to the heat output supplied by the heat storage unit during hydrogen absorption, is integrated into the components of the heating appliance in such a way that radiation heat from the electric heating elements does not lead to the product being spoilt.

10. A method for heating a product, comprising the steps of:
producing sufficient heat output to heat the product at the same time as the maximum temperature is limited by latent or thermochemical heat storage units;
actuating the heat storage units to work in conjunction with electrical heating elements of a heating area;
combining a heating appliance with a fuel cell when using a heat storage unit based on metal hydride, and using the hydrogen supplied to produce additional electrical energy during the hydrogen desorption phase of the heat storage unit.

11. The method of claim 10, wherein extra electric energy produced by a fuel cell is made available to other users through an electrical energy supply, or used for an electrical heating of the heat storage unit during the heat storage phase.

12. A method of heating a product on board means of transport, comprising the steps of:
producing sufficient heat output to heat the product at the same time as the maximum temperature is limited by latent or thermochemical heat storage units;
actuating the heat storage units to work in conjunction with electrical heating elements of a heating area;
wherein, the heat storage unit is heated up during periods of low loading in the an electrical on-board supply of the means of transport, and the heat storage unit supplies heat in an insulated heating area after catering containers with food have been pushed in.

13. A heating device for heating a product, comprising:
a housing having a heating area adapted to accept product;
a heating unit providing heat to said heating area;
a heating storage unit associated with said heating area, said heat storage unit adapted to provide heat to said heating area based on thermochemical heat storage;
wherein thermochemical heat storage is provided by high temperature metal hydride.

14. The heating device of claim 13, further comprising a hydrogen storage unit associated with said heat storage unit.

15. The heating device of claim 13, wherein the heat storage unit is utilized to provide heat to said heating area to raise the temperature of said heating area to a temperature beyond that capable by said heating unit alone.

16. The heating device of claim 13, further comprising a controller adapted to control the relative level of heat provided to the heating area by the heating unit and the heating storage unit, respectively.

* * * * *

UNITED STATES PATENT AND TRADEMARK OFFICE
CERTIFICATE OF CORRECTION

PATENT NO. : 7,285,753 B2  
APPLICATION NO. : 11/010493  
DATED : October 23, 2007  
INVENTOR(S) : Merle Hoehne, Joachim Hoehne and Hans-Juergen Heinrich Page 1 of 1

It is certified that error appears in the above-identified patent and that said Letters Patent is hereby corrected as shown below:

Title Pg, Item (30) Foreign Application Priority Data, "103 30 303" should read --103 60 303--

Col. 6, Line 28, delete "the" before "an electrical"

Signed and Sealed this

Fifteenth Day of April, 2008

JON W. DUDAS  
*Director of the United States Patent and Trademark Office*